A. C. FLETCHER,
Car Spring.

No. 88,155.

Patented March 23, 1869.

Witnesses:

United States Patent Office.

ADDISON C. FLETCHER, OF NEW YORK, N. Y.

*Letters Patent No. 88,155, dated March 23, 1869.*

IMPROVED CAR-SPRING.

The Schedule referred to in these Letters Patent and making part of the same.

*To all whom it may concern:*

Be it known that I, ADDISON C. FLETCHER, of the city, county, and State of New York, have invented a new and useful Improvement in Springs, of which the following is a full, clear, and exact description, reference being had to the accompanying drawing, forming part of this specification, and in which—

Figure 1:
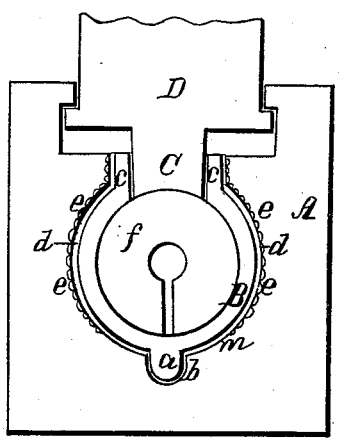
Figure 2:
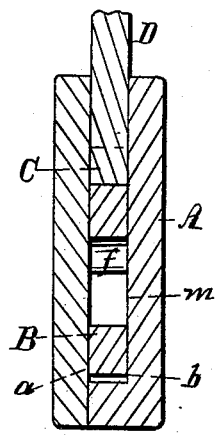

Figure 1 represents a side, or face view of my improved spring under one form or modification and mode of applying it, and Figure 2, a transverse section of the same.

Similar letters of reference indicate corresponding parts.

My invention consists in the combination of a metallic spring, of divided, hoop-like form, with its mouth, which is established by the division in the spring, made of tapering character, for operation in connection with a wedge attached to or forming part of the device, or portion the spring is designed to sustain, or, the order being reversed, attached to or forming part of the sustaining-device, or portion, with outside rubber strips arranged on opposite sides of the metallic spring, between it and the sides of the recess in which the spring lies, to soften and give a compound elastic character to the metallic spring, and restrain it from snapping, in case of a sudden pressure being applied to the spring.

The invention also consists in a combination, with this last-mentioned feature, of a corrugated interior surface to the recess in which the spring lies, for the purpose of retaining the rubber strips in place, and in proper relationship to the sides of the metallic spring.

The invention further consists in a rubber filling to the metallic spring, to aid, by the action of the wedge on it, in giving increased elasticity and strength to the spring, and to retain it in form, and also restrain it from snapping or injury.

In referring to the accompanying drawing, it may be well to remark, in advance, that there are not only various uses, or purposes to which my improved spring may be applied, but it may be arranged to sustain pressure in various and changing directions. The following description of it, however, in a simple form, will suffice to illustrate its peculiar construction and principle of action.

A is a box, or case, which forms the spring-seat, by means of a stud, *a*, on the spring B, arranged to fit a cavity, *b*, in the box.

This spring B is of metal, preferably steel, and is of a divided, hoop-like form; also is shown as arranged within a similar-shaped, but somewhat larger recess, *m*, in the box, or case.

Said spring, where it is divided, to form a mouth, opposite the stud *a*, is shaped to constitute lips *c c*, which are of an interior tapering configuration converging inwardly.

C is a wedge, attached to or forming part of the device, or portion D, which the spring serves to sustain. This wedge forms a close fit within the lips *c c* so that, upon weight or pressure being applied to the portion D, the wedge causes the spring to open, or expand, and, upon weight or pressure being taken off the portion D, an opposite action of the spring takes place. This wedge-like gear, or connection of the spring B and portion D, secures a gradual and easy action in both directions of motion, and makes available, in an equable manner, on both sides, from the stud *a* as a centre, the entire force of the spring.

The gradual and easy manner of connecting, for action together, the spring B and portion D, reduces the tendency of the spring to snap, in case of any sudden application or removal of pressure; but the following additional devices to secure this, as well as other advantages, may also be used:

Within the recess *m*, on either side of the metallic spring, are introduced strips of rubber, *d*, that also act as springs, and cushion the metallic spring on its oppositely-expanding and contracting sides; also aid in closing said spring.

These strips are put in loose, and prevented from falling down or out of place, by corrugations *e*, formed in opposite sides of the recess, which gives a secure, yet free hold, as regards play, to the elastic strips.

Inside, too, of the metallic spring, is arranged a rubber filling, *f*, which likewise cushions said spring in its closing-action, and, on the wedge C being brought down to bear upon it, softens the pressure on the metallic spring, and gives a compound character to the whole device as a spring, adding to the strength and elasticity of the metallic spring, and retaining it in shape. Said rubber filling *f* is preferably opened or cut, to give to it an easier spring-like action, as shown in fig. 1 of the drawing.

What is here claimed, and desired to be secured by Letters Patent, is—

1. The combination, with the divided, hoop-like spring B, of the outside rubber strips, or springs *d d*, for action together, as specified.

2. In combination with the spring B and outside rubber strips *d d*, the corrugations *e e*, arranged in opposite sides of the recess in which the spring B lies, substantially as described.

3. The combination of the rubber filling, *f*, with the divided, hoop-like spring B, essentially as specified.

ADDISON C. FLETCHER.

Witnesses:
J. W. COOMBS,
FRED. HAYNES.